UNITED STATES PATENT OFFICE.

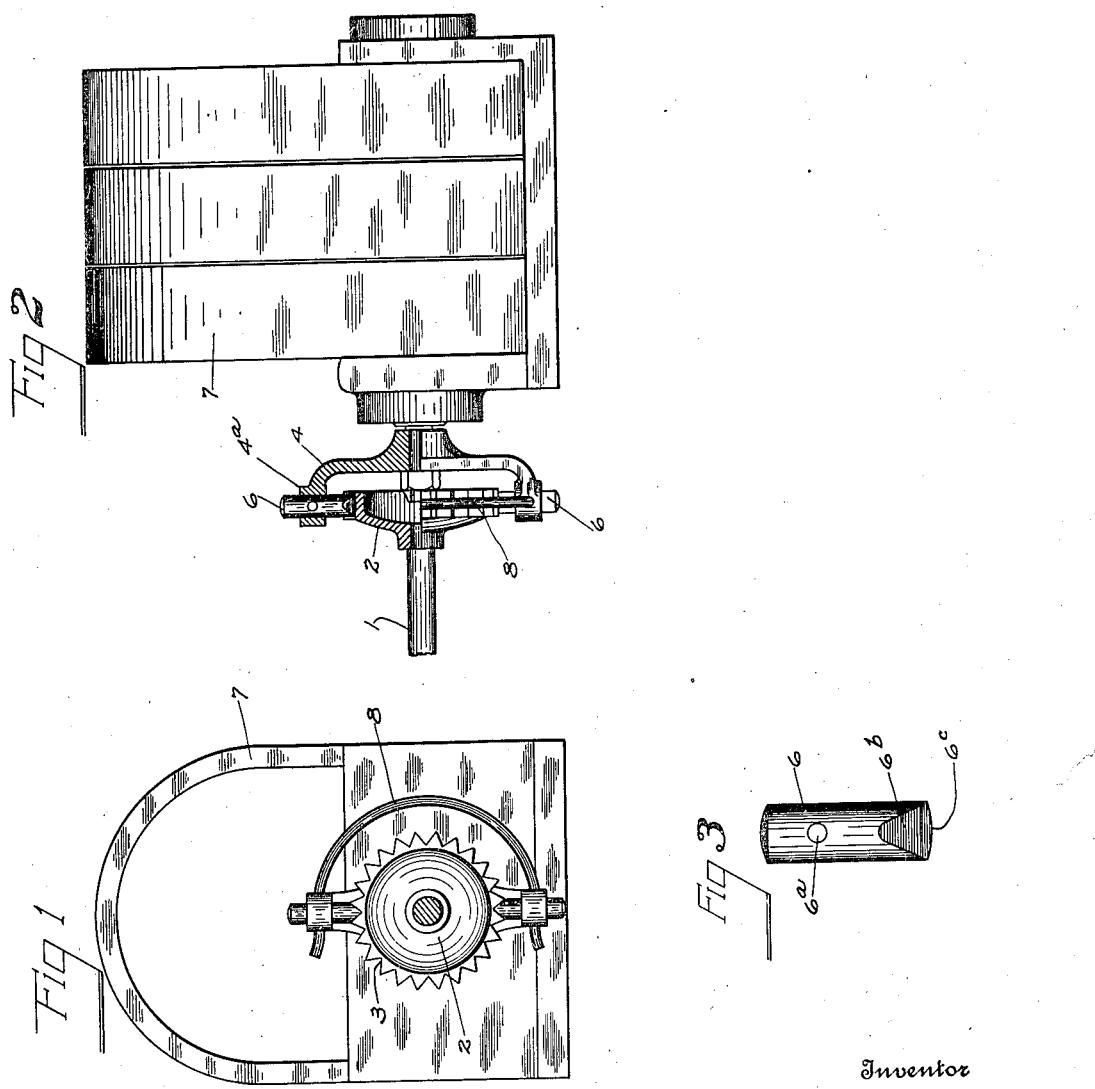

CHARLES BALOUGH, OF SPRINGFIELD, OHIO, ASSIGNOR TO THE KELLY-SPRINGFIELD MOTOR TRUCK COMPANY, OF SPRINGFIELD, OHIO, A CORPORATION OF OHIO.

MAGNETO-COUPLING.

1,173,406.

Specification of Letters Patent.

Patented Feb. 29, 1916.

Application filed November 7, 1913. Serial No. 799,796.

*To all whom it may concern:*

Be it known that I, CHARLES BALOUGH, a citizen of Austria-Hungary, residing at Springfield, in the county of Clark and State of Ohio, have invented certain new and useful Improvements in Magneto-Couplings, of which the following is a specification.

My invention relates to improvements in couplings for connecting a magneto with a driving shaft of an explosive engine, and the object of the invention is to provide a coupling which will compensate for lack of proper alinement so that any such lack of alinement will not affect the bearings of the shaft and magneto, and at the same time provide for easily and readily timing the magneto.

In the said drawings, Figure 1 is an end view of the magneto and coupling, showing the driving shaft in section. Fig. 2 is a side elevation of the same with a portion of the coupling shown in section. Fig. 3 is a detail of one of the coupling pins.

Like parts are represented by similar characters of reference throughout the several views.

In the said drawings, 1 represents a driving shaft which may be driven in any suitable manner from the engine. Fixed on the end of this shaft is a disk 2, the periphery of which is provided with a series of teeth to form notches or serrations 3. Connected to the shaft of the magneto, represented by 7, is a yoke 4, the oppositely-arranged arms of which are provided with laterally-projecting perforated portions 4ª in which are snugly fitting pins 6, which pins may be held in position in said arms by a locking device in the nature of a spring wire 8, the ends of which extend through perforations in said arms and also perforations 6ª in the respective pins. The ends of these pins are of a flattened or V-shape, as indicated at 6ᵇ, the point of the flattened or V-shaped portion being rounded as indicated at 6ᶜ.

In operation, the shaft 1 is connected to the magneto shaft by causing the pins to engage the notches of the disk 2. By reason of the play which the pins will have in the notches owing to the rounded shape of the end of said pins, any lack of alinement between the driving and magneto shafts will have no effect upon the bearings for said shafts. By removing the locking device 8 and raising the pins, they may be readily shifted from one notch to another for the purpose of timing the magneto.

By this construction it will be seen that there is devised a coupling which readily compensates for any lack of alinement between the shafts and by which adjustment may be very readily and quickly made for the purpose of timing the magneto.

Having thus described my invention, I claim:—

1. In a coupling of the character described, a driving shaft member, a driven shaft member substantially in alinement therewith, a circular member secured to one of said shaft members having serrated teeth, pins slidably connected with the other shaft member and having curved inner surfaces at the extremities thereof, and means for securing said pins against vertical movement for the purpose specified.

2. In a coupling of the character described, a driving shaft, a driven shaft in substantial alinement therewith, a circular member on one of said shafts, a yoke-shaped member on the other shaft, pins slidably mounted in said yoke-shaped member adapted to engage said circular member, and a slidable member for holding said pins within said yoke member, for the purpose specified.

3. In a coupling of the character described, a driving shaft, a driven shaft in substantial alinement therewith, a disk secured to one of said shafts, a yoke-shaped member connected with the other of said shafts, pins slidably mounted in said yoke-shaped member, and a flexible fastening device for a plurality of said pins, substantially as specified.

4. In a coupling of the character described, a driving shaft, a driven shaft in alinement therewith, a disk secured to one of said shafts, a yoke-shaped member secured to the other shaft and embracing said disk, pins in the respective arms of said yoke-shaped member in line with said disk, and movable radially relatively to the center of said disk, said disk having radially arranged teeth for engagement with said pins, and a U-shaped spring wire extending through perforations in the yoke member and pins, respectively, to hold said pins in position.

In testimony whereof, I have hereunto set my hand this 30th day of October, 1913.

CHARLES BALOUGH.

Witnesses:
CHAS. I. WELCH,
ESTHER E. PFEIFER.